(12) United States Patent
Hong et al.

(10) Patent No.: US 6,469,762 B1
(45) Date of Patent: Oct. 22, 2002

(54) OPTICALLY COMPENSATED SPLAY MODE LCD

(75) Inventors: Seung Ho Hong; Hyang Yul Kim; Seung Hee Lee, all of Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 87 days.

(21) Appl. No.: 09/607,557

(22) Filed: Jun. 29, 2000

(30) Foreign Application Priority Data

Jun. 29, 1999 (KR) .......................................... 99-25213

(51) Int. Cl.[7] ..................... G02F 1/1337; G02F 1/1335; C09K 19/02; C09K 19/52; G09G 5/00
(52) U.S. Cl. ...................... 349/123; 349/117; 349/120; 349/178; 345/214; 252/299.01
(58) Field of Search ................ 349/123, 129, 349/130, 117, 119, 120, 121, 178; 252/299.01, 299.6; 345/214

(56) References Cited

U.S. PATENT DOCUMENTS

| | | | |
|---|---|---|---|
| 5,377,028 A | 12/1994 | Yoshida et al. ............... 359/53 |
| 5,619,352 A | 4/1997 | Koch et al. ................... 349/89 |
| 5,677,747 A | 10/1997 | Ishikawa et al. .............. 349/76 |
| 5,694,187 A | * 12/1997 | Abileah et al. ............. 349/120 |
| 5,825,445 A | * 10/1998 | Okamoto et al. ........... 349/118 |
| 5,959,707 A | 9/1999 | Murai et al. ................. 349/129 |
| 5,995,184 A | 11/1999 | Chung et al. ............... 349/118 |
| 6,061,116 A | * 5/2000 | Nishida et al. ............. 349/130 |
| 6,069,620 A | * 5/2000 | Nakamura et al. .......... 345/214 |
| 6,151,003 A | * 11/2000 | Tsuda et al. .................. 345/87 |
| 6,221,444 B1 | * 4/2001 | Okada et al. .............. 428/1.25 |

FOREIGN PATENT DOCUMENTS

JP 01217315 8/1989

* cited by examiner

*Primary Examiner*—William L. Sikes
*Assistant Examiner*—Tarifur R. Chowdhury
(74) *Attorney, Agent, or Firm*—Ladas & Parry

(57) ABSTRACT

Disclosed is a optically compensated splay mode liquid crystal display. The device includes: lower and upper substrates opposed with intervening a selected distance and having driving electrodes in their inner surfaces respectively and a liquid crystal layer sandwiched between the lower and the upper substrates and having a plurality of liquid crystal molecules, wherein no voltage is applied to the driving electrodes, the liquid crystal molecules are arranged in a bend state, and wherein a voltage above a critical voltage is applied to the driving electrodes, the liquid crystal molecules are arranged in a splay state which makes a symmetry of up and down with respect to a middle layer of the liquid crystal layer.

18 Claims, 8 Drawing Sheets

OPTICALLY COMPENSATED SPLAY MODE LCD

FIELD OF THE INVENTION

The present invention generally relates to liquid crystal displays(LCDS), more particularly to an optically compensated splay mode LCD having enhanced picture quality.

BACKGROUND OF THE INVENTION

Nevertheless its narrow viewing angle characteristic, the twisted nematic(TN) mode LCDs have been widely used for notebook computers. However, in order to substitute the cathode ray tube(CRT) in the monitor and television set market, it is a preconsideration of LCDs to have wide viewing angle characteristic.

As a recent development to improve the TN mode LCD's viewing angle characteristic, a technique to form a dual domain in a liquid crystal layer of a TN-LCD and an IPS-LCD have been suggested. Herein, followings are the technique to form the dual domain in the liquid crystal layer; (1) a multiple rubbing method; (2) a multiple alignment layer method; (3) an edge fringe field method; and (4) parallel fringe field method.

However, those methods require cumbersome manufacturing steps. For example, in the case of the multiple rubbing method, it requires more than one rubbing step and photolithography step for each panel or two substrates. In the case of the multiple alignment layer method, alignment layer patterning and etching steps for one substrate or two substrates are required. In the case of the parallel fringe field method, a patterning step for an ITO layer on a color filter is required. Those steps in the foregoing three methods include the further steps of coating, baking, patterning, developing and removing photoresist. Furthermore, the multiple rubbing method requires a rubbing step for an additional layer, the multiple alignment layer method requires a step of coating an additional layer, or the parallel fringe field method requires an etching method at the color filter portion. Therefore, the manufacturing process of the dual domain is more complicated than that of the conventional single domain, also costs a greater deal. Moreover, viewing angles in the multiple rubbing method are asymmetric.

Further, the IPS-LCD has great performance in the viewing angle characteristics, however its transmittance and aperture ratio are very low and the response time is very slow.

As a result, there has been suggested an optically compensated bend (OCB) mode LCDs compensating the birefringence of liquid crystal molecules so as to obtain the uniform viewing angle characteristic at all directions without requiring numbers of rubbing steps, as well as to the response time characteristic. (See reference: SID 93 Digest page. 277, "Wide-Viewing-Angle Display mode for the Active-Matrix LCD Using Bend-Alignment Liquid Crystal Cell, Y. Yamaguchi, T. Miyashita, T. Uchida).

FIGS. 1A to 1C are cross-sectional views for illustrating the constructions and the operation of a conventional OCB mode LCD.

As shown in FIG. 1A, a lower substrate 10 and an upper substrate 15 are opposed with intervening a selected distance therebetween. A liquid crystal layer 18 having a plurality of liquid crystal molecules 18a is sandwiched between the lower and the upper substrates 10,15. Herein, the liquid crystal molecules 18a have, for example, the positive dielectric anisotropy. At inner surfaces of the lower and the upper substrates 10,15, a pixel electrode 11 and a counter electrode 16 for driving the liquid crystal molecules 18a are formed respectively. Further, a first alignment layer 12 is disposed between the liquid crystal layer 18 and the lower substrate 10 including the pixel electrode 11, a second alignment layer 17 is disposed between the liquid crystal layer 18 and the upper substrate 15 including the counter electrode 16. The first and the second alignment layers 12,17 are homogeneous alignment layers having the pre-tilt angle of below 10° C., and they are rubbed in a direction parallel to each other. First and second polarizing plates 19a,19b are disposed at outer surfaces of the lower substrate 10 and the upper substrate 15 respectively. Herein, the polarizing axes of the first and the second polarizing plates 19a,19b are arranged to cross each other, and one of the polarizing axes forms a selected angle with respect to the rubbing direction, for example approximately 45° C. or 135° C.

Operation of the OCB mode LCD is as follows.

First of all, as shown in FIG. 1A, the liquid crystal molecules 18a are arranged in a splay type according to the influence of the first and the second alignment layers 12,17 when no voltage difference is occurred between the pixel electrode 11 and the counter electrode 16. As a result, the polarizing state of an incident light passing through the liquid crystal layer is changed, and the light is leaked while passing the second polarizing plate 19b.

Meanwhile, when a voltage above the critical voltage Vs is applied to the pixel electrode, the liquid crystal molecules 18a in a middle layer as shown in FIGS. 1B and 1C are arranged such that their long axes are almost parallel to an electric field. As a result, the liquid crystal molecule arrangement of the splay type is changed into a bend type. Herein, FIG. 1B illustrates the liquid crystal molecule arrangement when the critical voltage Vs is applied to the pixel electrode, and FIG. 1C illustrates the liquid crystal molecule arrangement when the voltage above the critical voltage Vs is applied to the pixel electrode.

When voltage is applied, the splay state of the liquid crystal molecule arrangement is changed into the bend state that long axes thereof are parallel to the electric field because an electric field force directly loaded on the middle layer are not bearable.

Furthermore, when the voltage above the critical voltage is applied to the pixel electrode, liquid crystal molecules 18a of not only in the middle layer but also around the alignment layers are arranged their long axes to be parallel to the electric field thereby reducing the amount of transmitted light and also becoming gradually dark state. At this time, the OCB mode LCD employs the maximum amount of light as the white state during the bend state, and the OCB mode LCD employs as the dark state the minimum amount of light when the voltage above the critical voltage is applied to the pixel electrode. That is, the voltage below the critical voltage is not used for the display mode.

Since the liquid crystal molecules 18a are arranged to form symmetries up and down with respect to the middle layer when the electric field is formed, the phase of the liquid crystal molecules is naturally compensated while light is passing through the lower substrate 10 to the upper substrate 15. Furthermore, since the dark state is obtained when a predetermined critical voltage is applied to, the backflow is not occurred and relatively fast response time is obtained.

However, the OCB mode LCD has the following problems.

General LCDs include spherical or elliptic spacers(not shown) dispersed in the liquid crystal layer so as to maintain the cell gap. At this time, the liquid crystal 30 molecules in the conventional OCB mode LCDs are in the splay state and arranged along curved faces of the spaces before the electric field is applied. That is to say, as shown in FIG. 2, as the liquid crystal molecules 18a are arranged along the curved faces of the spacers in the splay state, the liquid crystal molecules in the spacer-disposed portions are arranged insecurely. Accordingly, the initial liquid crystal molecule arrangement is insecure, change of the splay state into the bend state is insecure when a high voltage above the critical voltage.

Furthermore, as shown in FIG. 3, the pixel electrode 11 is formed as a pattern and having a predetermined step difference, the first alignment layer 12 is formed on the pixel electrode 11. As a result, the long axes of the liquid crystal molecules 18a on the first driving electrode 11 are parallel to the first alignment layer 12. However, the liquid crystal molecules 18a at the step difference portion of the pixel electrode 11 are arranged such that their long axes are parallel to the stepped face, thereby occurring the reverse tilt.

As the alignment of the liquid crystal molecules is partially bad and the reverse tilt is occurred step difference portion, picture quality of device is degraded and it is very difficult to change uniformly its splay state to the bend state even though a high voltage above the critical voltage is applied thereto.

Moreover, although the critical voltage is applied to the pixel electrode, it takes a considerable amount time to change the splay state into the bend state. Also the change is not uniform per pixel. As a result, the high voltage above the critical voltage should be applied to change quickly the splay state into the bend state with uniformity.

SUMMARY OF THE INVENTION

Accordingly, it is the object of the present invention to provide an LCD capable of obtaining wide viewing angle as well as improving picture quality.

To accomplish the foregoing object of the present invention, an LCD comprises: lower and upper substrates opposed with intervening a selected distance and having driving electrodes in their inner surfaces respectively and a liquid crystal layer sandwiched between the lower and the upper substrates and having a plurality of liquid crystal molecules, wherein no voltage is applied to the driving electrodes, the liquid crystal molecules are arranged in a bend state, and wherein a voltage above a critical voltage is applied to the driving electrodes, the liquid crystal molecules are arranged in a splay state which makes a symmetry of up and down with respect to a middle layer of the liquid crystal layer.

Further, the LCD comprises: lower and upper substrates opposed with intervening a selected distance and having driving electrodes in their inner surfaces respectively; a liquid crystal layer sandwiched between the lower and the upper substrates and having a plurality of liquid crystal molecules; first and second alignment layers disposed at the respective inner surfaces of the lower and the upper substrates; and first and second polarizing plates disposed at the respective outer surfaces of the lower and the upper substrates, wherein the liquid crystal molecules have negative dielectric anisotropy, wherein the first and the second alignment layers have pre-tilt angle of below 90° and they are rubbed in a direction parallel to each other, wherein one of polarizing axes of the first and the second polarizing plates forms a selected degree of angle with a rubbing axis.

The LCD of the present invention still comprises: lower and upper substrates opposed with intervening a selected distance and having driving electrodes in their inner surfaces respectively; a liquid crystal layer sandwiched between the lower and the upper substrates and having a plurality of liquid crystal molecules; first and second alignment layers disposed at the respective inner surfaces of the lower and the upper substrates; first and second polarizing plates disposed at the respective outer surfaces of the lower and the upper substrates; and a phase compensation plate between the upper substrate and the second polarizing plate, or between the lower substrate and the first polarizing plate, wherein the liquid crystal molecules have negative dielectric anisotropy, wherein polarizing axes of the polarizing plates are perpendicular to each other, wherein the first and the second alignment layers have pre-tilt angle of below 90° and they are rubbed in a direction parallel to each other, wherein one of the polarizing axes of the first and the second polarizing plates forms a selected degree of angle with a rubbing axis.

DETAILED DESCRIPTION OF THE PREFERRED EMBODIMENT

Figure 1A:
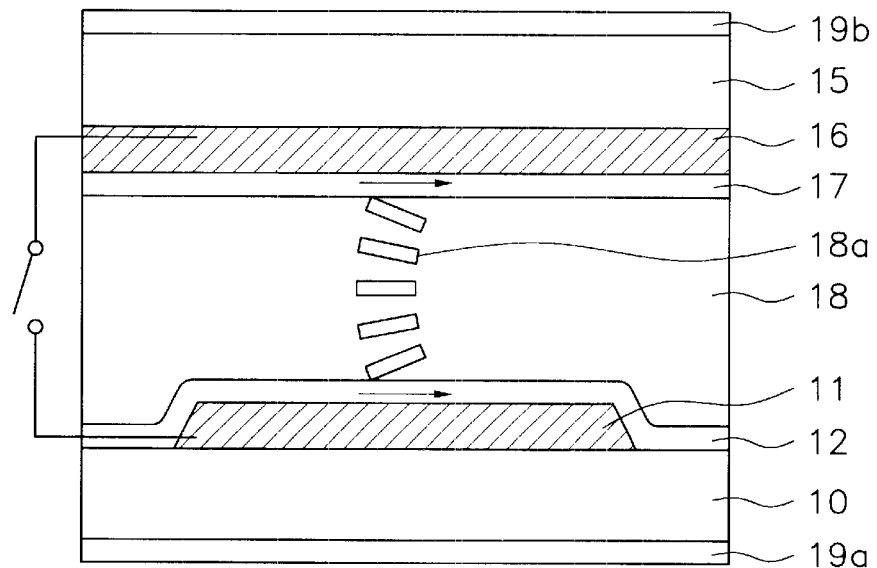
FIGS. 1A to 1C illustrate a conventional OCB mode LCD.
Figure 1B:
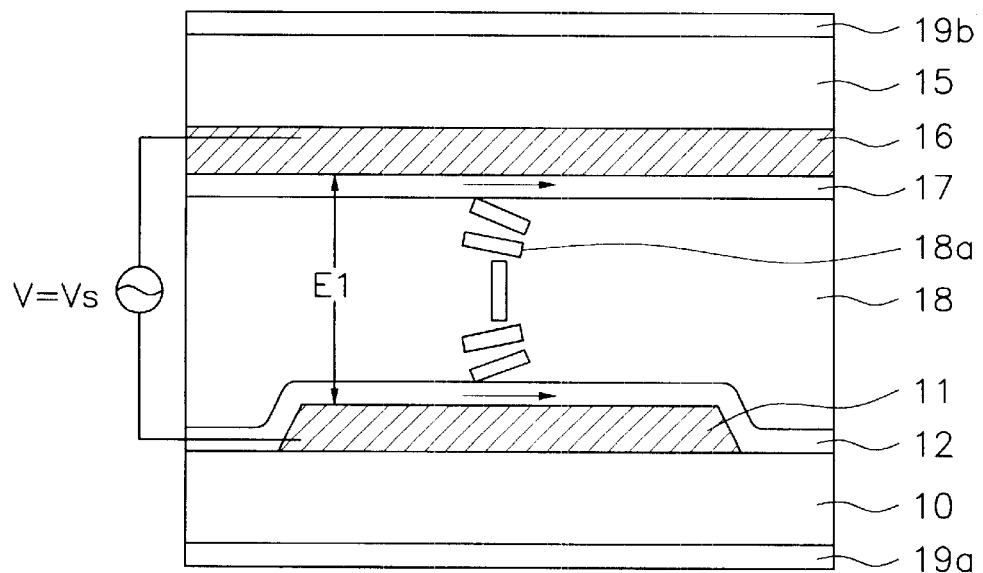
Figure 1C:
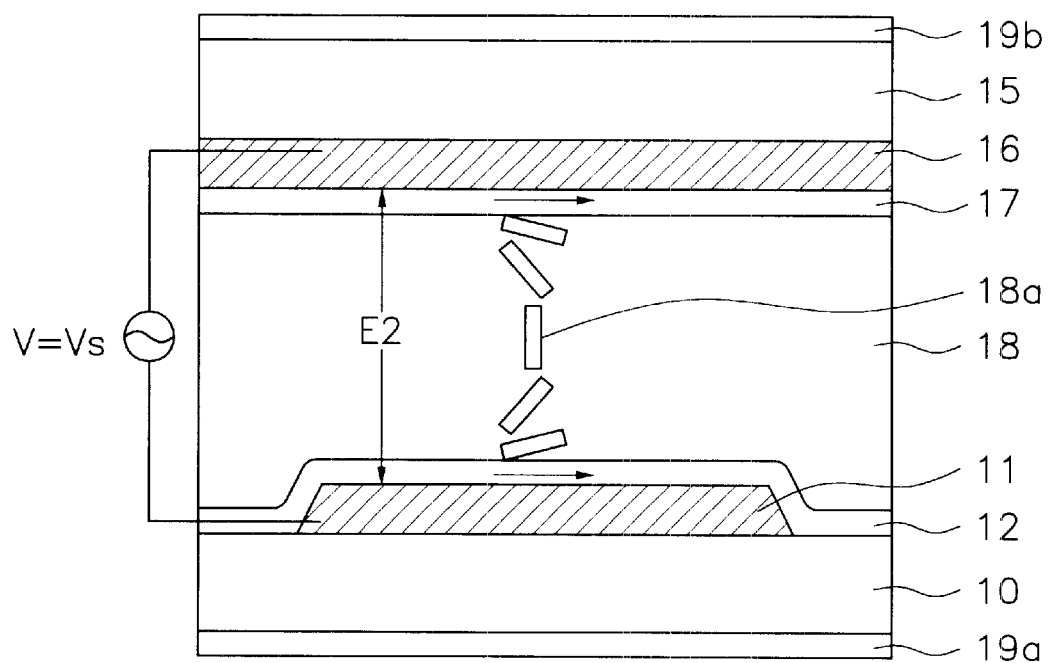
Figure 2:
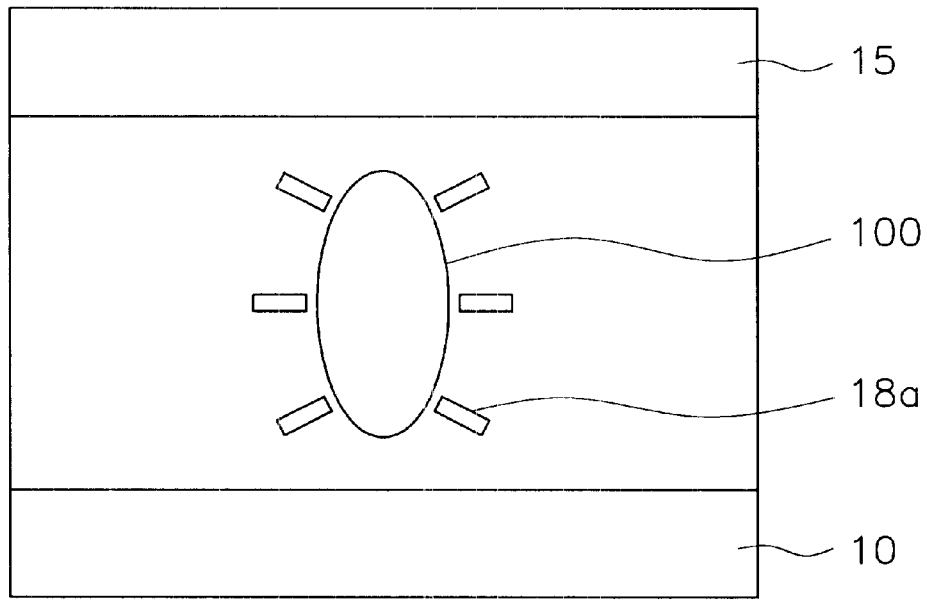
FIG. 2 is a cross-sectional view for briefly illustrating a portion in which spacers are dispersed in a conventional LCD.
Figure 3:
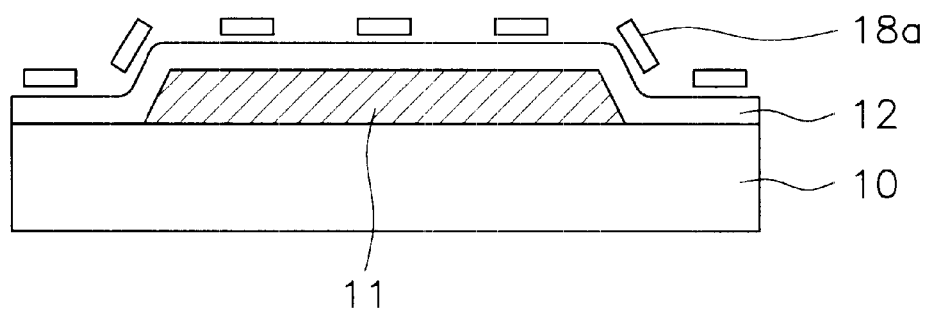
FIG. 3 is a cross-sectional view only showing a lower substrate of a conventional LCD.
Figure 4A:
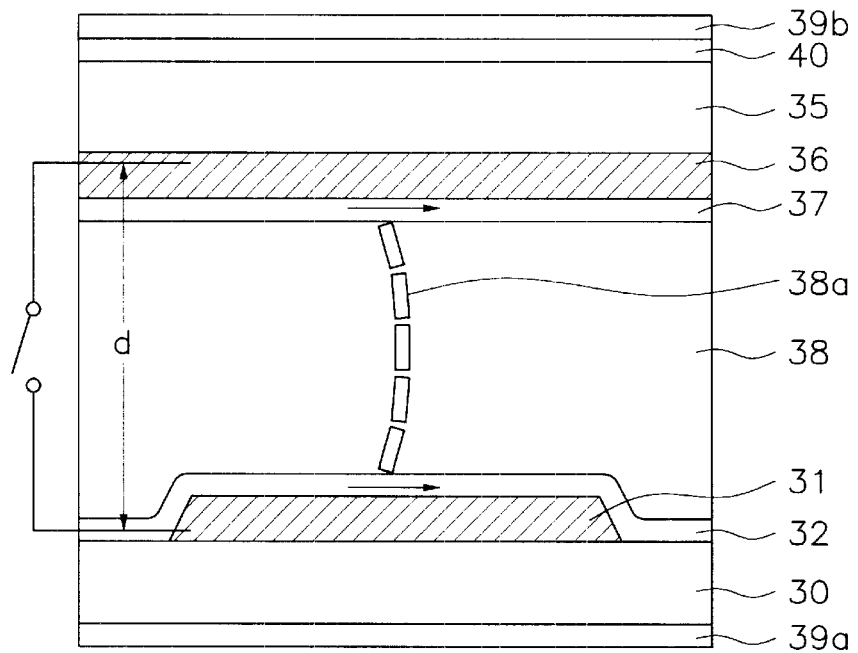
FIGS. 4A and 4B are views for illustrating an LCD according to the present invention.

Referring to FIG. 4A, a lower substrate 30 and an upper substrate 35 are opposed with intervening a selected distance. The lower substrate 30 and the upper substrate 35 are preferably made of a transparent insulator. A liquid crystal layer 38 having a plurality of liquid crystal molecules 38a is sandwiched between the lower substrate 30 and the upper substrate 35. Herein, the dielectric anisotropy of the liquid crystal layer 38 is negative, i.e. the dielectric anisotropy range of −15~−1. Additionally, a product of thickness of the liquid crystal layer 38 and the birefringence index, i.e. the phase retardation index $\Delta nd$ is preferably 0.2~2.0 $\mu m$. Furthermore, the liquid crystal molecules 38a are preferably made of materials having small bend elasticity coefficient K33 of approximately $1.5 \times 10^{-11}$N.

A pixel electrode 31, a driving electrode is formed at an inner surface of the lower substrate 30, and a counter electrode 36 is formed at an inner surface of the upper substrate 35. At this time, both the pixel electrode 31 and the counter electrode 36 are formed with a transparent conductor, for example an ITO material preferably. Further, first alignment layer 32 is formed at an inner surface of the lower substrate 30 in which the pixel electrode 31 is disposed, and a second alignment layer 37 is formed at an inner surface of the upper substrate 35 in which the counter electrode 36 is disposed. Herein, the first alignment layer 32 and the second alignment layer 36 have the pre-tilt angle of below 90°, preferably in the range of 45°~90° and they are rubbed in the same direction.

Meanwhile, a first polarizing plate 39a is disposed at an outer surface of the lower substrate 30 and a second polarizing plate 39b is disposed at an outer surface of the upper substrate 35. Herein, a polarizing axis of the first polarizing plate 39a is crossed with a polarizing axis of the second polarizing plate 39b, and one of those axes forms a selected angle with respect to the rubbing axis, preferably approximately 30°~50°, more preferably 45° or approximately 120°~140°, and more preferably 135°. The reason is to obtain the maximum transmittance by arranging the angle between one of the polarizing axes and long axes of the liquid crystal molecules in a middle layer to be 35~55° (or 120~140° ) and more preferably approximately 45°(or 135° ), when a voltage above the critical voltage is applied. Further, a phase compensation plate 40 is sandwiched between the upper substrate 35 and the second polarizing plate 39b so as to implement display. The phase compensation plate 40 consists of liquid crystal molecules(not shown) having negative birefringence index and the liquid crystal molecules in the phase compensation plate 40 are arranged in the splay state when a selected voltage is applied. In addition, the liquid crystal molecules in the phase compensation plate 40 are arranged such that their long axes are perpendicular to the long axes of the liquid crystal molecules 38aa in the middle layer. At this time, the phase compensation plate 40 can be sandwiched between the lower substrate 30 and the first polarizing plate 39a, or both between the lower substrate 30 and the first polarizing plate 39a and between the upper substrate 35 and the second polarizing plate 39b. Herein, in case the phase compensation plate is formed at an outer surface of the lower and upper substrates 30,35, the phase retardation index of the phase compensation plate 40 is in the range of −0.2~2.0 μm. Further, in case the phase compensation plate is formed at outer surfaces of both lower and upper substrates 30,35, the phase retardation indices of the respective phase compensation plates 40 are in the range of −0.1~0.8 μm. Herein, total amount of the phase retardation indices of the phase compensation plates 40 is preferably equal to that of the liquid crystal layer 38.

Operation of the LCD as constituted above is following.

As shown in FIG. 4A, when no electric field is formed 35 between the pixel electrode 31 and the counter electrode 36, the liquid crystal molecules 38a are arranged in the bend state depending on the pre-tilt angles of the first and the second alignment layers 32,37. Consequently, since an incident light passing through the first polarizing plate 39a and the liquid crystal layer 38 does not change its polarizing state, the light is blocked by the second polarizing plate 39b. Accordingly, the screen becomes dark.

Figure 5:
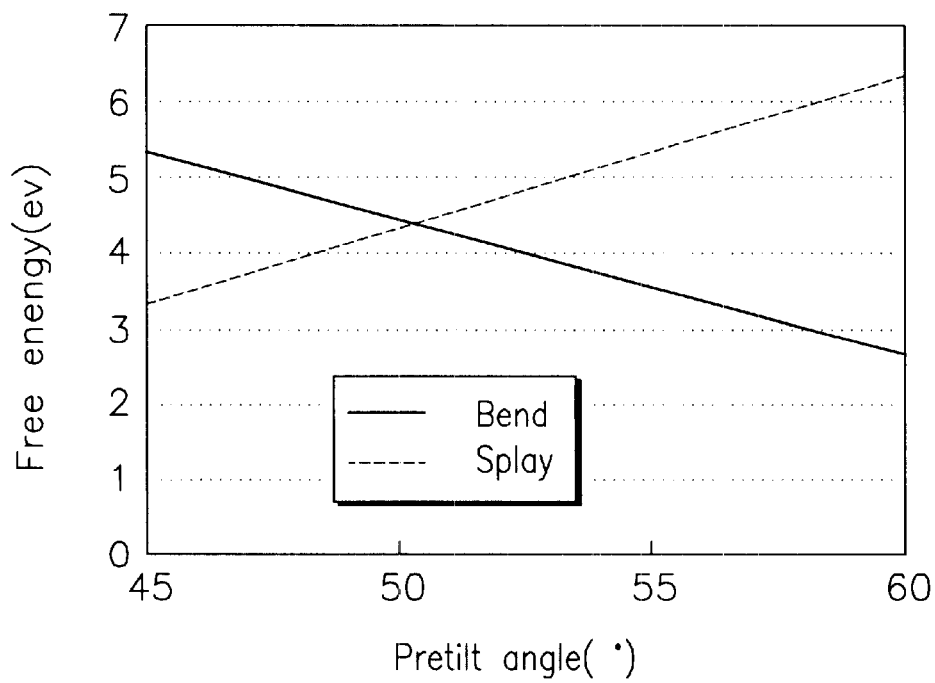
FIG. 5 is a graph showing a free energy according to pre-tilt angles of the LCD.

FIG. 5 is a graph showing the free energy according to the pre-tilt angles. As shown in the drawing, it is securer the liquid crystal molecules in the bend state when the pre-tilt angle is over 50°. As a result, the liquid crystal molecules 38a of the LCD in the present embodiment are securely arranged before the electric field is applied thereto.

Furthermore, as the liquid crystal molecules 38a are arranged in the bend state before the electric field is applied, the liquid crystal molecules 38a in the portion where spacers are dispersed are also arranged along the curved faces of the spacers in the bend state naturally. Therefore, no additional light leakage is occurred.

Also as in the step difference portion of the pixel electrode 32, the liquid crystal molecules are arranged to form the angle of below 90° with respect to the substrate surfaces, hard reverse tilt like the reverse tilt occurred in the OCB mode LCD is not caused. At this time, forming of a symmetry by the liquid crystal molecules 38a in up and down with respect to the middle layer ML is because the first and the second alignment layers 32,37 have the same pre-tilt angle and rubbed in the same direction.

Figure 4B:
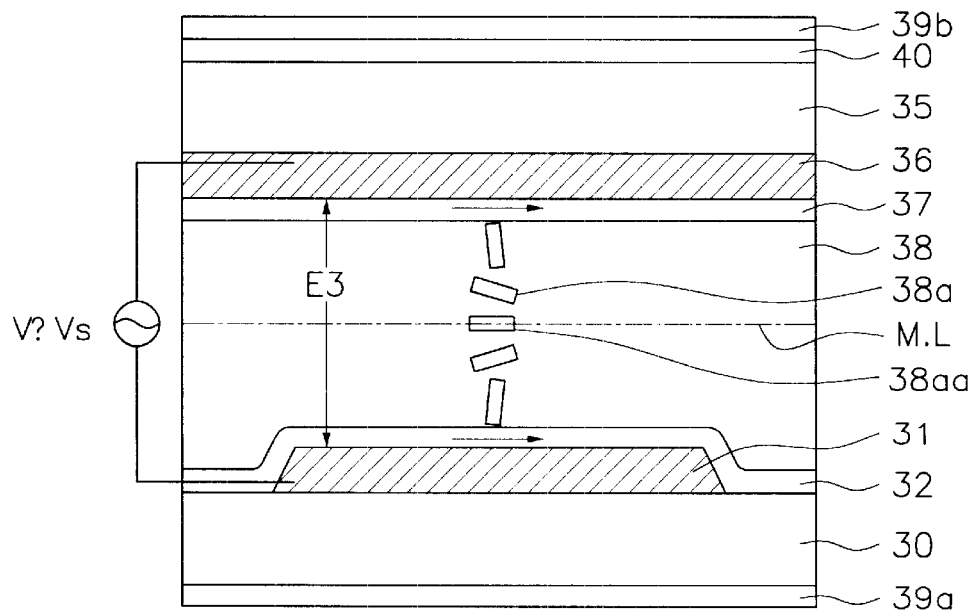

Meanwhile, as shown in FIG. 4B, when a voltage above the critical voltage Vs is applied to the pixel electrode 31, an electric field E3 is formed on the substrate between the pixel electrode 31 and the counter electrode 36. Then, the liquid crystal molecules 38a having the negative dielectric anisotropy are twisted so that their long axes are perpendicular to the electric field E3. As a result, the liquid crystal molecules 38a are arranged in the splay state. At this time, long axes of the liquid crystal molecules 38aa in the middle layer ML coincide with the rubbing axis and intersect with the polarizing axes of the first and the second polarizing plates 39a,39b, and one of the polarizing axes forms 35°~55° with the rubbing axis, thereby leaking light. Herein, among the voltages over the critical voltage, the highest mark showing the maximum transmittance becomes the voltage of white state and the lowest mark of the minimum transmittance becomes the voltage of dark state. At this time, the phase compensation plate 40 acts to make one of two voltages the complete dark state.

That is, when the critical voltage is applied to, the liquid crystal molecules 38a within the liquid crystal layer 38 are arranged to be in the splay state in which a symmetry in the up and down parts with respect to the middle layer ML appears. As a result, the birefringence of the liquid crystal molecules 38a in the liquid crystal layer 38 is self-compensated. Therefore, the viewing angle at an oblique direction, i.e. in the aspect of the polar angle is greatly improved. Also, the long axes of the liquid crystal molecules in the phase compensation plate 40 are perpendicular to those of the liquid crystal molecules 38aa in the middle layer ML, thereby greatly improving the viewing angle in the aspect of the azimuth angle.

As described in the present invention, the LCD device that the birefringence of the liquid crystal molecules in the liquid crystal layer is self-compensated and simultaneously the molecules are arranged in the splay state before the electric field is applied thereto, is call an optically compensated splay(OCS) mode LCD.

Herein, when the voltage applied to the pixel electrode 32 and the counter electrode 36 is below the critical voltage, it is encourage to periodically apply 35 high voltage so that the arrangement of the liquid crystal molecules in the splay state does not turn into the bend state.

Figure 6:
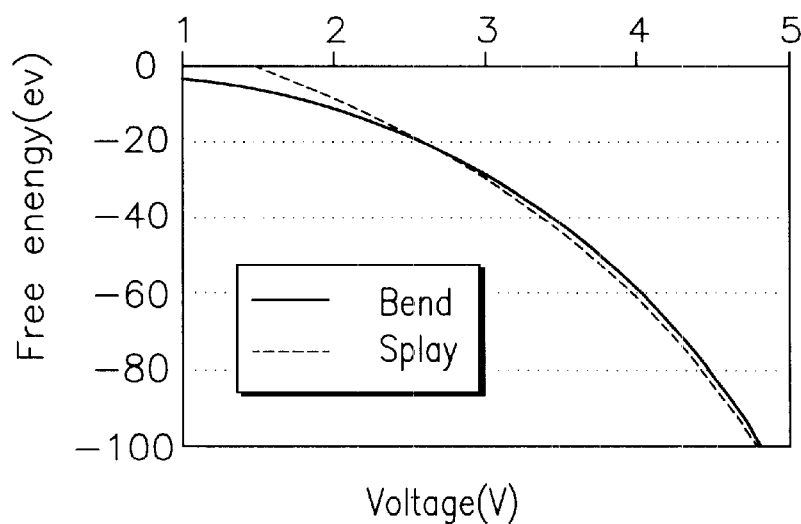
FIG. 6 is a graph showing a free energy according to voltages of the LCD.

FIG. 6 is a graph showing the free energy according to voltages in the LCD of the present invention. According to FIG. 6, when voltage above 3V is applied, the OCS mode of the LCD device is changed from the bend state to the splay state. Accordingly, the OCS mode of the present invention is changed from the bend state to the splay state at the voltage point above 3V. Therefore, the OCS mode LCD of the present invention drives at the point from 3V or above which can maintain the splay state.

Figure 7:
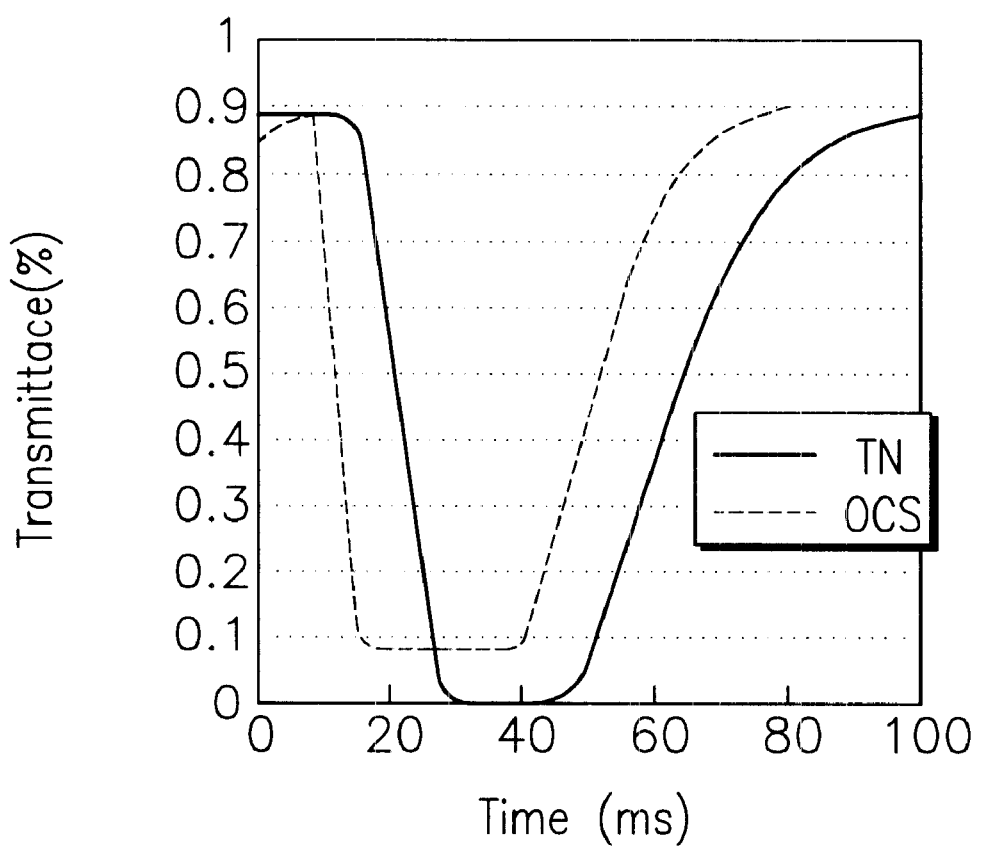
FIG. 7 is a graph showing a transmittance variation with the lapse of time.

FIG. 7 is a graph showing a transmittance variation with the lapse of time. According to FIG. 7, delay time of the OCS mode LCD of the present invention is rather faster than that of the conventional TN mode LCD. Namely, the rising time and decay time of the present LCD are 3.5 ms and 20 ms respectively, while those of the TN mode LCD are 14 ms and 37 ms. Consequently, the response time property of the present OCS mode LCD is superior to that of the conventional TN mode LCD.

Figure 8:
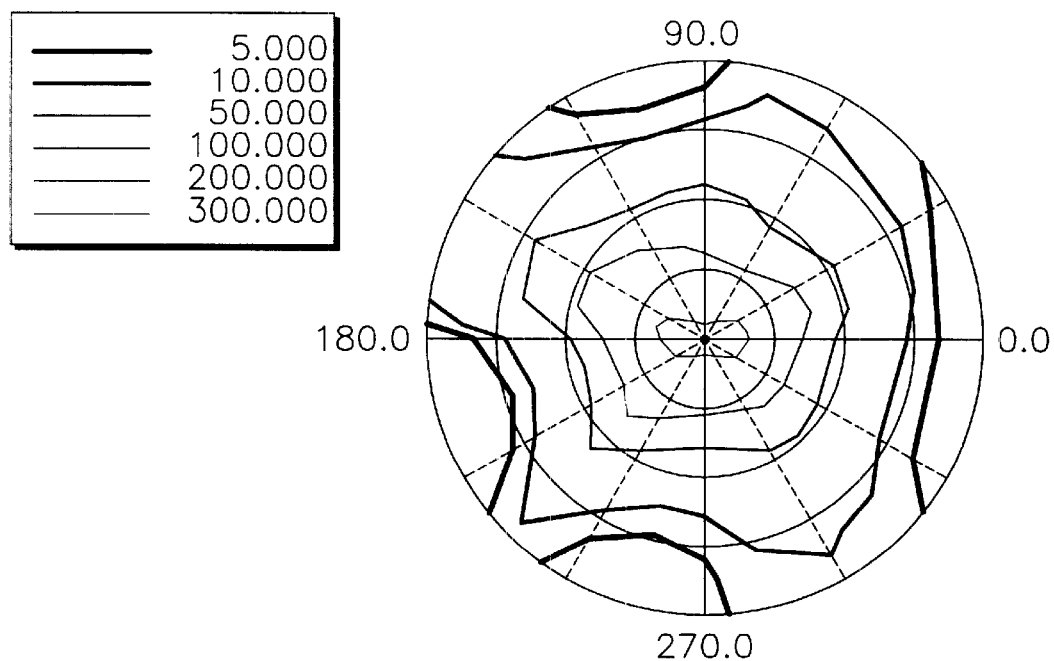
FIG. 8 shows an iso-contrast ratio according to the viewing angles of the present LCD.

FIG. 8 shows an equal contrast ratio according to the viewing angles of the present LCD. According to FIG. 8, the contrast ratio in all region of the screen appears 10.

Figure 9:
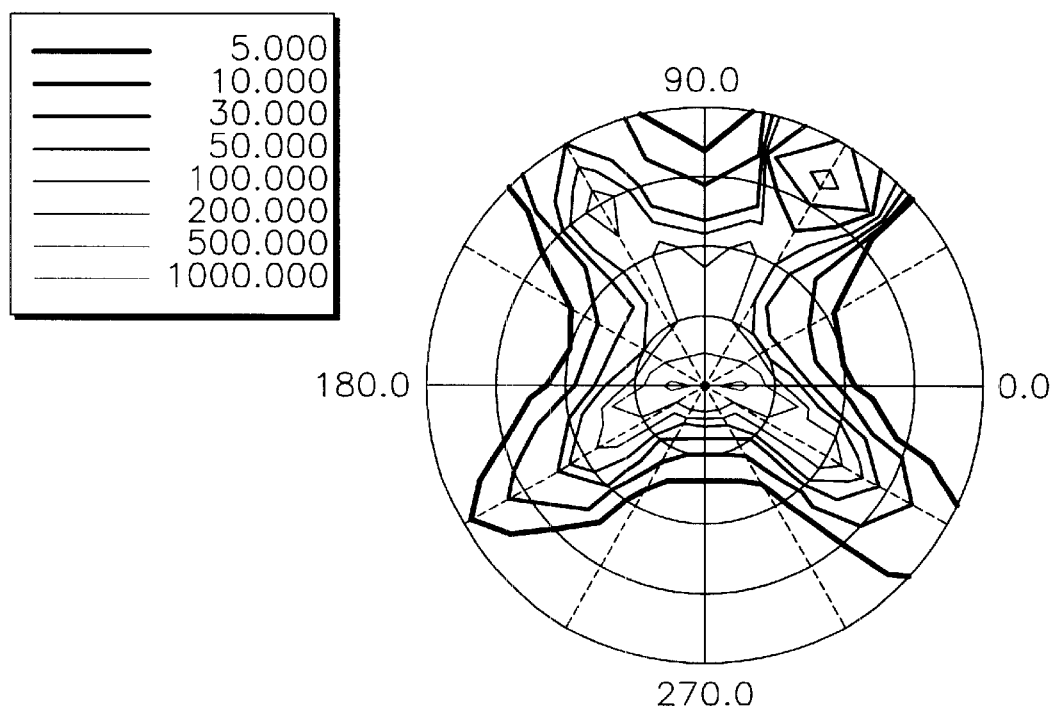
FIG. 9 shows an equal contrast ratio according the angles of a conventional TN mode LCD.
Figure 10:
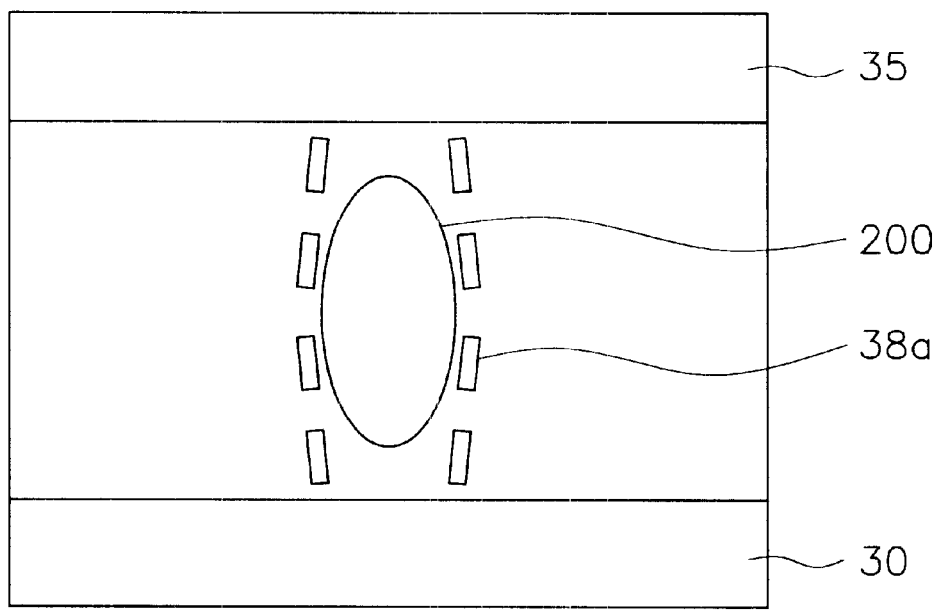
FIG. 10 is a cross-sectional view for briefly illustrating a portion in which spacers are dispersed in the present LCD.
Figure 11:
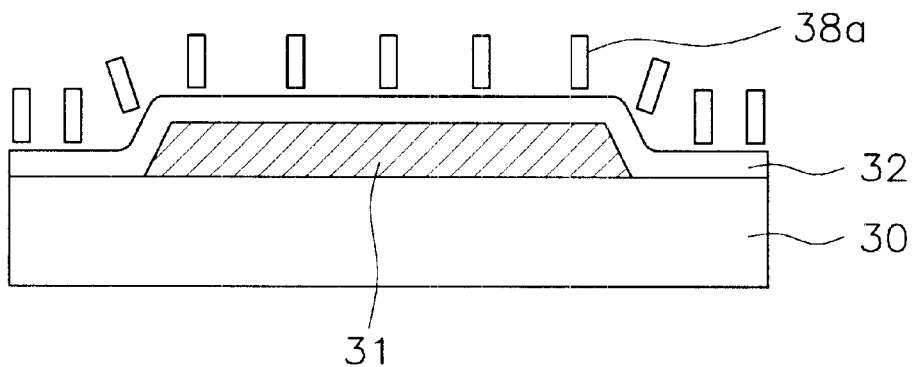
FIG. 11 is a cross-sectional view only showing a lower substrate of the present LCD.

Compared to the graph, i.e. FIG. 9 showing the iso-contrast ratio according to the viewing angle of the conventional TN mode LCD, more wider viewing angle is provided by the present invention.

As described in detail in the foregoing section, according to the present invention, the liquid crystal molecules are arranged in the bend state before the electric field is applied, and then they move as the splay state to make a symmetry of up and down with respect to the middle layer of the liquid crystal layer when the electric field is applied to. As a result, the birefringence of the liquid crystal molecules is compensated in the liquid crystal layer itself, thereby greatly improving the viewing angle property compared to that of the conventional TN mode LCD. Further, the response time characteristic is excellent. Additionally, according to the present invention, since the liquid crystal molecules are in the bend state before the electric field is applied, the liquid crystal molecules in the portion where spacers are dispersed are arranged along the curved faces of the spacers. Therefore bad alignment is not caused and the reverse tilt domain is not formed at the step difference portions of electrodes.

Other modifications of the present invention may be available without departing from the scope of the invention as defined by the attached claims.

What is claimed is:

1. An optically compensated splay (OCS) mode liquid crystal display (LCD) comprising:
    lower and upper substrates opposed with intervening a selected distance and having driving electrodes in their inner surfaces, respectively; a liquid crystal layer sandwiched between the lower and the upper substrates and having a plurality of liquid crystal molecules; and
    a phase compensation plate at an outer surface of the upper substrate or the lower substrate, the phase compensation plate having liquid crystal molecules arranged such that long axes thereof are perpendicular to those of the liquid crystal molecules of a middle layer of the liquid crystal layer,
    wherein no voltage is applied to the driving electrodes, the liquid crystal molecules are arranged in a bend state, and
    wherein a voltage above a critical voltage is applied to the driving electrodes, the liquid crystal molecules are arranged in a splay state which makes a symmetry of up and down with respect to the middle layer of the liquid crystal layer.

2. The OCS mode LCD of claim 1, wherein the liquid crystal molecules have negative dielectric anisotropy.

3. The OCS mode LCD of claim 1, further comprising an alignment layer having a pre-tilt angle of below 90° at the respective inner surfaces of the lower and the upper substrates.

4. An OCS mode LCD comprising:
    lower and upper substrates opposed with intervening a selected distance and having driving electrodes in their inner surfaces respectively;
    a liquid crystal layer sandwiched between the lower and the upper substrates and having a plurality of liquid crystal molecules;
    first and second alignment layers disposed at the respective inner surfaces of the lower and the upper substrates;
    first and second polarizing plates disposed at the respective outer surfaces of the lower and the upper substrates;
    wherein the liquid crystal molecules have negative dielectric anisotropy,
    wherein the first and the second alignment layers have pre-tilt angle of below 90° and they are rubbed in a direction parallel to each other,
    wherein one of polarizing axes of the first and the second polarizing plates forms a selected degree of angle with a rubbing axis,
    and wherein the phase compensation plate has liquid crystal molecules arranged such that long axes thereof are perpendicular to those of the liquid crystal molecules of a middle layer of the liquid crystal layer.

5. The OCS mode LCD of claim 4, wherein the first and the second alignment layers have the pre-tilt angle range of 45° to 70°.

6. The OCS mode LCD of claim 5, wherein the polarizing axes of the first and the second polarizing plates intersect to each other.

7. The OCS mode LCD of claim 6, wherein an angle formed by the rubbing axis and one of the polarizing axes of the first and the second polarizing plates is approximately in the range of 35°~55°.

8. The OCS mode LCD of claim 4, wherein the phase compensation plate comprises the liquid crystal molecules of negative birefringence.

9. The OCS mode LCD of claim 8, wherein phase retardation index of the phase compensation plate is in the range of approximately −0.2~2.0 μm.

10. The OCS mode LCD of claim 4, wherein phase retardation index of the liquid crystal layer is in the range of 0.2~2.0 μm.

11. The OCS mode LCD of claim 4, wherein the dielectric anisotropy index of the liquid crystal molecules is in the range of −2~−15.

12. An OCS mode LCD comprising:
    lower and upper substrates opposed with intervening a selected distance and having driving electrodes in their inner surfaces respectively;
    a liquid crystal layer sandwiched between the lower and the upper substrates and having a plurality of liquid crystal molecules;
    first and second alignment layers disposed at the respective inner surfaces of the lower and the upper substrates;
    first and second polarizing plates disposed at the respective outer surfaces of the lower and the upper substrates; and
    phase compensation plates disposed between the upper substrate and the second polarizing plate, and between the lower substrate and the first polarizing plate, respectively,
    wherein the liquid crystal molecules have negative dielectric anisotropy,
    wherein polarizing axes of the polarizing plates are perpendicular to each other,
    wherein the first and the second alignment layers have pre-tilt angle of below 90° and they are rubbed in a direction parallel to each other, wherein one of the polarizing axes of the first and the second polarizing plates forms a selected degree of angle with a rubbing axis, and wherein each phase compensation plate has liquid crystal molecules arranged such that long axes thereof are perpendicular to those of the liquid crystal molecules of a middle layer of the liquid crystal layer.

13. The OCS mode LCD of claim 12, wherein the first and the second alignment layers have the pre-tilt angle in the range of 45°~90°.

14. The OCS mode LCD of claim 13, wherein an angle formed by the rubbing axis and one of the polarizing axes of the first and the second polarizing plates is approximately in the range of 35°~55°.

15. The OCS mode LCD of claim 12, wherein each phase compensation plate comprises the liquid crystal molecules of negative birefringence.

16. The OCS mode LCD of claim 15, wherein phase retardation index of the phase compensation plate is in the range of approximately −0.2~−1.5 μm.

17. The OCS mode LCD of claim 12, wherein phase retardation index of the liquid crystal layer is in the range of 0.2~1.5 μm.

18. The OCS mode LCD of claim 12, wherein dielectric anisotropy index of the liquid crystal molecules is in the range of −2~−15.

* * * * *